(12) United States Patent
Foo et al.

(10) Patent No.: US 12,505,067 B2
(45) Date of Patent: Dec. 23, 2025

(54) CONFIGURABLE LOGIC SYSTEM AND METHOD FOR PIPELINED DATA TRANSFER

(71) Applicant: EFINIX, INC., Cupertino, CA (US)

(72) Inventors: Kok Yoong Foo, Butterworth (MY); Jia Chi Koe, Bukit Mertajam (MY)

(73) Assignee: EFINIX, INC., Cupertino, CA (US)

( * ) Notice: Subject to any disclaimer, the term of this patent is extended or adjusted under 35 U.S.C. 154(b) by 0 days.

(21) Appl. No.: 18/658,579

(22) Filed: May 8, 2024

(65) Prior Publication Data

US 2025/0348459 A1    Nov. 13, 2025

(51) Int. Cl.
*G06F 15/78* (2006.01)

(52) U.S. Cl.
CPC ...... *G06F 15/7878* (2013.01); *G06F 15/7889* (2013.01)

(58) Field of Classification Search
None
See application file for complete search history.

(56) References Cited

U.S. PATENT DOCUMENTS

| | | | | |
|---|---|---|---|---|
| 6,446,249 B1* | 9/2002 | Wang | ............... | G06F 30/331 |
| | | | | 326/38 |
| 6,467,009 B1* | 10/2002 | Winegarden | ........ | G06F 13/4217 |
| | | | | 712/15 |
| 7,076,595 B1* | 7/2006 | Dao | .................... | G06F 15/7867 |
| | | | | 710/100 |

FOREIGN PATENT DOCUMENTS

CN    116301920    6/2023

* cited by examiner

*Primary Examiner* — Farley Abad
*Assistant Examiner* — Dayton Lewis-Taylor
(74) *Attorney, Agent, or Firm* — HSML P.C.

(57) ABSTRACT

The present invention relates to a configurable logic system (101) programmed to model a logic design for data pipeline between master and slave; and the method of implementation, wherein said system (101) comprises of at least one first register (112) configured to store and transfer at least one data from said master to said slave; wherein said system (101) is configured to operate on one clock and one reset. The system (101) further comprises of at least one first control logic (118) that controls said first register (112) and fourth register (109) to provide hold to the ready signal from the slave to ease timing closure at high speed.

6 Claims, 3 Drawing Sheets

CONFIGURABLE LOGIC SYSTEM AND METHOD FOR PIPELINED DATA TRANSFER

1. TECHNICAL FIELD OF THE INVENTION

The present invention relates to a configurable logic system programmed to model a logic design for data pipeline between master and slave; and the method of implementation, wherein said system comprises of at least one first register configured to store and transfer at least one data from said master to said slave; wherein said system is configured to operate on one clock and one reset. The system further comprises of at least one first control logic that controls said first register and fourth register to provide hold to the ready signal from the slave to ease timing closure at high speed.

2. BACKGROUND OF THE INVENTION

In a configurable logic system, area and timing close is essential to ensure the required design is able to be implemented within the available resources and time requirement, especially when the implementation is in high speed. The process of transferring data in a single clock cycle from an upstream entity/master to a downstream entity/slave in a configurable logic system can be done by said upstream entity asserting the data and the valid signal, and while the downstream entity/slave accepting the data while driving a ready signal back to said upstream entity to confirm that the data can be accepted. This creates a problem with timing closure, as it could end up with a substantially long path for said ready signal routed through a plurality of stages of pipes. This can be shown in FIG. 1, which is an example of a configurable logic system of the prior art whereby the slv_ready signal has to be routed through three pipelines of registers thus creating delay and difficulty in timing closure. Some designs may even incur more pipelines of registers, causing even more delay and difficulty in timing closure.

There is a solution of the prior art to reduce the high fanout of the ready signal to ease the timing closure, by implementing a holding or path-cutting register for the ready signal; whereby an extra holding register set is added. However, a complicated control finite-state machine (FSM) may be needed to be used to control the data switching between holding register and data register. The FSM and the corresponding control logic are also part of the contributors of failure of area and timing closure.

WU GANG et al, CN116301920A, disclosed an FPGA-based high-performance accelerator in the field of convolutional neural network technology accelerator application, whereby the convolution engine in the accelerator is a full pipeline systolic array set based on the im2col parallel strategy. Furthermore, on each clock cycle, the synchronizer will fetch the next entry from these FIFOs if data is ready in these FIFOs. However, this prior art does not implement using hold registers and robust pipeline design in implementation of data pipeline with ready signal.

Hence, it would be advantageous to alleviate the shortcomings by having a configurable logic system programmed to model a logic design for data pipeline between master and slave and the method of implementation which provides a hold to the ready signal from the slave to ease timing closure at high speed.

3. SUMMARY OF THE INVENTION

Accordingly, it is the primary aim of the present invention to provide a configurable logic system programmed to model a logic design for data pipeline between the master and slave; and method of implementation which is able to ease timing closure at high speed.

It is yet another objective of the present invention to provide a configurable logic system programmed to model a logic design for data pipeline between the master and slave; and method of implementation which does not create bandwidth performance degradation.

It is yet another objective of the present invention to provide a configurable logic system programmed to model a logic design for data pipeline between the master and slave; and method of implementation, whereby the multiplexers used are fully configurable and/or be optimized away as required by each user's preference and critical path location.

Additional objects of the invention will become apparent with an understanding of the following detailed description of the invention or upon employment of the invention in actual practice.

According to the preferred embodiment of the present invention the following is provided:

A configurable logic system programmed to model a logic design for data pipeline between master and slave comprising:
  at least one first register configured to store and transfer at least one data from said master to said slave;
  wherein said configurable logic system is configured to operate on one clock and one reset;
  characterized in that
  said first register is connected to at least one first control logic; said first register is configured to be enabled by said first control logic; said first register is configured to hold transfer of all or selected data to said slave when the ready signal from said slave is de-asserted;
  said system further comprises of at least one second control logic receiving said ready signal from said slave; and connected to said first control logic to enable at least one fourth register;
  said first control logic connected to at least one first multiplexer; said first control logic configured to select, by controlling said first multiplexer whether at least one second register receives data directly from said master, or data from said first register;
  said system further comprises of at least one third register configured to receive valid signal from said master through said first control logic; said third register is configured to be enabled by said first control logic; said third register configured to send valid signal to said slave;
  said first control logic is connected to at least one second multiplexer; said first control logic is configured to select, by controlling said second multiplexer, whether the value of ready signal to said master is based on the ready signal from said slave or output of said fourth register; wherein said fourth register is configured to register the ready signal from the slave to the master;
  said second control logic connected to at least one third multiplexer; said second control logic is configured to select, by controlling said third multiplexer, whether data to be sent to the slave is from said second register or said first register.

In another embodiment of the invention there is provided:
A method of implementing a configurable logic system programmed to model a logic design for data pipeline between master and slave, comprising the steps of:
  (i) holding transfer of all or selected data from said master to said slave by at least one first register when the ready signal from said slave is de-asserted; wherein said first register is configured to be enabled by said first control logic;

(ii) asserting valid signal from said master to said slave by at least one third register; wherein said third register is configured to receive said valid signal from said master through said first control logic; wherein said third register is configured to be enabled by said first control logic;

(iii) receiving asserted said ready signal from said slave by at least one second control logic; wherein said second control logic is connected to said first control logic to enable said first register;

(iv) registering said ready signal from said slave to said master by at least one fourth register; wherein said first control logic is configured to select, by controlling at least one second multiplexer, whether the value of ready signal to said master is based on the ready signal from said slave or output of said fourth register;

(v) send data from said master to said slave;

wherein said first control logic configured to select, by controlling at least one first multiplexer whether at least one second register receives data directly from said master, or data from said first register;

wherein said second control logic is configured to select, by controlling at least one third multiplexer, whether data to be sent to the slave is from said second register or said first register;

wherein said configurable logic system is configured to operate on one clock and one reset.

4. BRIEF DESCRIPTION OF THE DRAWINGS

Other aspect of the present invention and their advantages will be discerned after studying the Detailed Description in conjunction with the accompanying drawings in which:

FIG. 3 is a plurality of waveform of signals when user provides input to application with high performance turned on.

5. DETAILED DESCRIPTION OF THE DRAWINGS

Figure 1:
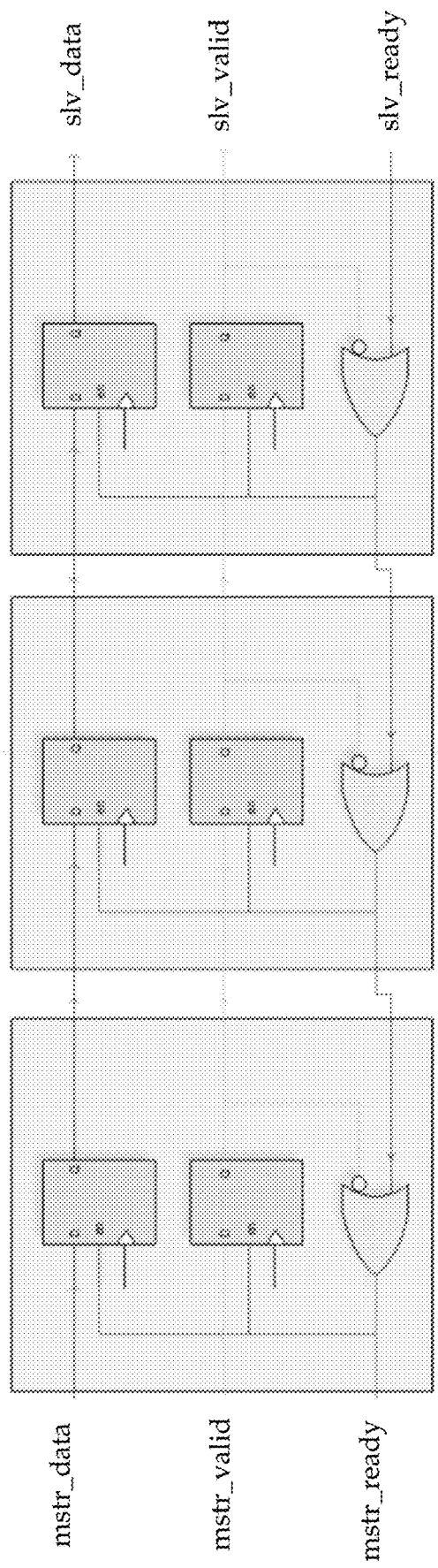
FIG. 1 is an example of a configurable logic system of the prior art whereby the ready signal from the slave is not registered.
Figure 2:
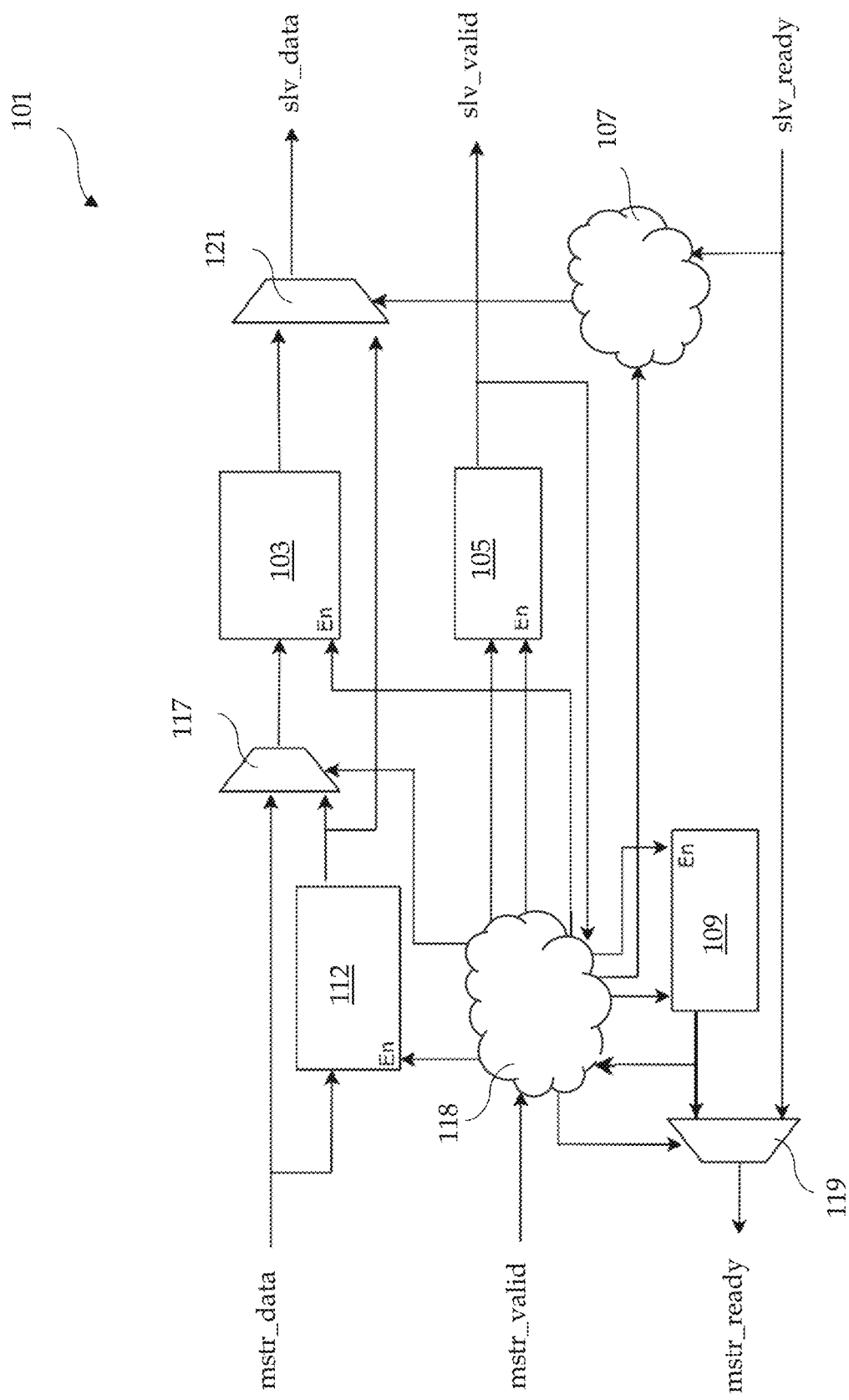
FIG. 2 is a configurable logic system programmed to model a logic design for data pipeline between master and slave of the present invention.

In the following detailed description, numerous specific details are set forth in order to provide a thorough understanding of the invention. However, it will be understood by the person having ordinary skill in the art that the invention may be practised without these specific details. In other instances, well known methods, procedures and/or components have not been described in detail so as not to obscure the invention.

The invention will be more clearly understood from the following description of the embodiments thereof, given by way of example only with reference to the accompanying drawings, which are not drawn to scale.

The present invention is a configurable logic system 101 programmed to model a logic design for data pipeline between master and slave comprising at least one first register 112 configured to store and transfer at least one data from said master to said slave; wherein said configurable logic system 101 is configured to operate on one clock and one reset. The first register 112 can be one bank of hold registers.

The first register 112 is connected to at least one first control logic 118, whereby said first register 112 is configured to be enabled by said first control logic 118 and said first register 112 is configured to hold transfer of all or selected data to said slave when the ready signal from said slave is de-asserted.

The configurable logic system 101 further comprises of at least one second control logic 107 receiving said ready signal from said slave; and connected to said first control logic 118 to enable at least one fourth register 109. The ready signal is registered to cut the path between the master and slave to ease timing closure.

The first control logic 118 is connected to at least one first multiplexer 117, whereby said first control logic 118 configured to select, by controlling said first multiplexer 117 whether at least one second register 103 receives data directly from said master, or data from said first register 112.

The configurable logic system 101 further comprises of at least one third register 105 configured to receive valid signal from said master through said first control logic 118, whereby said third register 105 is configured to be enabled by said first control logic 118 and said third register 105 is configured to send valid signal to said slave.

The first control logic 118 is connected to at least one second multiplexer 119. The first control logic 118 is configured to select, by controlling said second multiplexer 119, whether the value of ready signal to said master is based on the ready signal from said slave or output of said fourth register 109, wherein said fourth register 109 is configured to register the ready signal from the slave to the master. The fourth register 109 is also used to cut the timing path of the ready signal from the slave to reduce the timing closure. The timing path is cut because it is registered instead of a direct path to the master. When the master's valid signal is asserted, but the slave's ready signal is deasserted, then signal from said fourth register 109 will be de-asserted, and data is stored in said first register 112. After said data is stored in said first register 112, signal from said fourth register 109 will be asserted when the slave's ready signal is released.

The second control logic 107 is connected to at least one third multiplexer 121 whereby said second control logic 107 is configured to select, by controlling said third multiplexer 121, whether data to be sent to the slave is from said second register 103 or said first register 112.

The first control logic 118 is further configured to control said first register 112 whether to receive new data from said master or to maintain its current value.

The configurable logic system 101 programmed to model a logic design for data pipeline between master and slave of the present invention, further comprises of an application configured to be invoked through said configurable logic system 101 wherein said application is configured to receive at least one input from a user. The input configures said application to implement either one of the following options. The first option is data pipeline implementation with ready signal back pressure, whereby data is not transferred from said master to said slave if the ready signal from said slave it not asserted; whereby said ready signal from slave is not registered. An example of input is a BACK_PRESSURE/HBP parameter being set to 0. BACK PRESSURE/HBP is an example of a parameter's customised naming convention used in the present invention whereby the parameter can be chosen by the user to choose between a registered ready signal from the slave or an unregistered ready signal from the slave. Other naming convention can also be used. The second option is data pipeline implementation with ready signal back pressure and with said first multiplexer 117 enabled. An example of input is HBP parameter being set to 1 while a MUX_IN parameter being set to 1. MUX_IN is an example of a parameter's customised naming convention used in the present invention whereby the parameter can be chosen by the user to choose between enabling or disabling said first multiplexer 117. Other naming convention can also be used. The third option is data pipeline implementation with ready signal back pressure and with said third multiplexer 121 enabled. An example of input is HBP parameter being set to 1 while the MUX_IN parameter being set to 0. In one example of application, the user can choose between an option of a normal pipeline with ready signal back pressure or another option of a high-bandwidth and high-performance pipeline with registered ready signal back pressure. Another input that is used to configure said application to set the width of said data. An example of such input is D_WIDTH parameter being set to the required data width. D_WIDTH is an example of a parameter's customised naming convention used in the present invention whereby the parameter can be chosen by the user to provide the width of the data. Other naming convention can also be used.

In certain situation, the optimizable first multiplexer 117, and third multiplexer 121 may introduce additional cell delay to the data path differently. In order to mitigate the timing closure pressure, the user can choose to relocate said first multiplexer 117, and third multiplexer 121 to either the input side or output side, depending on the location of the critical path. Critical path is the combinational path between an input and output that has the maximum timing delay. The second multiplexer 119 will be optimized away by said application during every configuration. Thus, said second multiplexer 119 does not provide extra delay.

Figure 3:
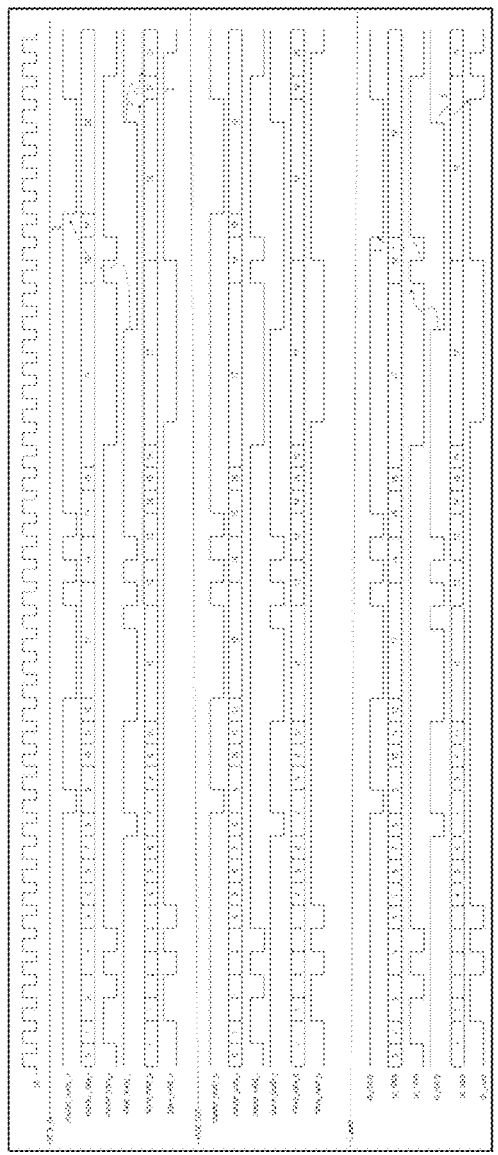

As shown in FIG. 3, which shows a plurality of waveform of signals when implementing design of the present invention with registered ready signal and first multiplexer 117 (MUX_IN design) or design of the present invention with registered ready signal and third multiplexer 121 (MUX_OUT design) versus a conventional design with first multiplexer 117 and third multiplexer 121 disabled (Case3 design); whereby the user provides input to said application with high performance turned on. As shown in FIG. 3, focusing on pointer 1 versus pointer 2, the us_valid signal is de-asserted after the first data. Further than that, focusing on pointer 3 versus point 4, the conventional design introduces one bubble/void cycle when ds_ready signal is asserted, reducing the bandwidth performance because less data can be transferred compared to the design of the present invention.

Figure 4:
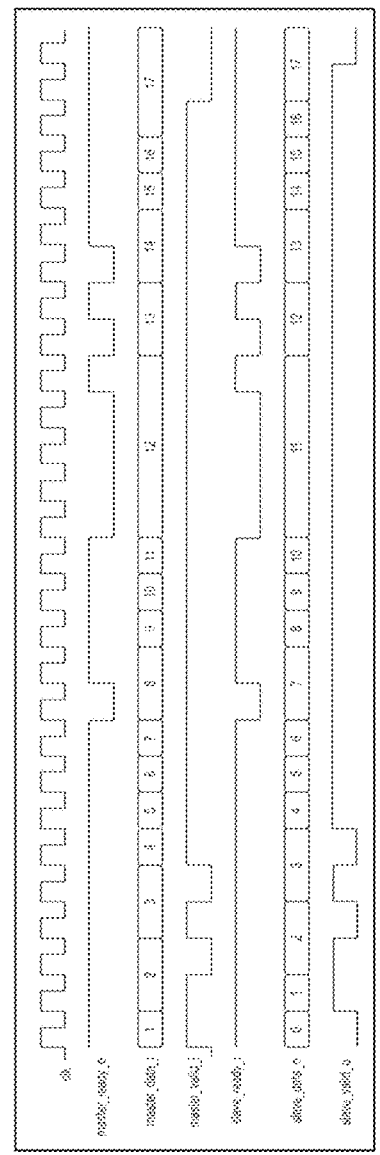
FIG. 4 is a plurality of waveform of signals when user provides input to application with high performance turned off.

As shown in FIG. 4, which shows a plurality of waveform of signals when implementing design of the present invention; whereby the user provides input to said application with high performance turned off. In this setting, the design is implemented whereby the ready signal is not registered, with no hold registers and extra controlled signals, thus allowing maximum savings in area/configurable logic resources as long as the timing requirement is met.

Another embodiment of the present invention is a method of implementing a configurable logic system 101 programmed to model a logic design for data pipeline between master and slave, comprising the following steps. In step (i), transfer of all or selected data from said master to said slave is hold by at least one first register 112 when the ready signal from said slave is de-asserted. The first register 112 is configured to be enabled by said first control logic 118.

In Step (ii), valid signal is asserted from said master to said slave by at least one third register 105. The third register 105 is configured to receive said valid signal from said master through said first control logic 118. The third register 105 is configured to be enabled by said first control logic 118.

In Step (iii), asserted said ready signal is received from said slave by at least one second control logic 107. The second control logic 107 is connected to said first control logic 118 to enable said first register 112.

In Step (iv), said ready signal from said slave to said master is registered by at least one fourth register 109. The first control logic 118 is configured to select, by controlling at least one second multiplexer 119, whether the value of ready signal to said master is based on the ready signal from said slave or output of said fourth register 109.

In Step (v), data is sent from said master to said slave. The first control logic 118 configured to select, by controlling at least one first multiplexer 117 whether at least one second register 103 receives data directly from said master, or data from said first register 112. The second control logic 107 is configured to select, by controlling at least one third multiplexer 121, whether data to be sent to the slave is from said second register 103 or said first register 112. The configurable logic system 101 is configured to operate on one clock and one reset.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

What is claimed is:

1. A configurable logic system programmed to model a logic design for data pipeline between master and slave comprising:
   at least one first register configured to store and transfer at least one data from the master to the slave;
   wherein the configurable logic system is configured to operate on one clock signal line and one reset signal line;
   the first register is connected to at least one first control logic; the first register is configured to be enabled by the first control logic; the first register is configured to hold transfer of all or selected data to the slave when a ready signal from the slave is de-asserted;
   the system further comprises at least one second control logic receiving the ready signal from the slave and being connected to the first control logic to enable at least one fourth register;
   the first control logic connected to at least one first multiplexer; the first control logic configured to select, by controlling the first multiplexer whether at least one second register receives data directly from the master, or data from the first register;
   the system further comprises at least one third register configured to receive a valid signal from the master through the first control logic; the third register is configured to be enabled by the first control logic; the third register configured to send the valid signal to the slave;

the first control logic is connected to at least one second multiplexer; the first control logic is configured to select, by controlling the second multiplexer, whether the ready signal to the master has value based on the ready signal from the slave or an output of the fourth register, wherein the fourth register is configured to register the ready signal from the slave to the master;

the second control logic connected to at least one third multiplexer; the second control logic is configured to select, by controlling the third multiplexer, whether data to be sent to the slave is from the second register or the first register.

2. The configurable logic system programmed to model the logic design for data pipeline between master and slave as claimed in claim 1, wherein the first control logic is further configured to control the first register whether to receive new data from the master or to maintain its current value data.

3. The configurable logic system programmed to model the logic design for data pipeline between master and slave as claimed in claim 1, further comprises an application configured to be invoked through the configurable logic system wherein the application is configured to receive at least one input from a user.

4. The configurable logic system programmed to model the logic design for data pipeline between master and slave as claimed in claim 3, wherein the input configures the application to implement any one of the following:

data pipeline implementation with a ready signal back pressure, whereby data is not transferred from the master to the slave if the ready signal from the slave is not asserted; whereby the ready signal from slave is not registered;

data pipeline implementation with a ready signal back pressure and with the first multiplexer enabled; or data pipeline implementation with a ready signal back pressure and with the third multiplexer enabled.

5. The configurable logic system programmed to model the logic design for data pipeline between master and slave as claimed in claim 3, wherein the input configures the application to set a width of the data.

6. A method of implementing a configurable logic system programmed to model a logic design for data pipeline between master and slave, comprising:

holding transfer of all or selected data from the master to the slave by at least one first register when a ready signal from the slave is de-asserted, wherein the first register is configured to be enabled by a first control logic;

asserting a valid signal from the master to the slave by at least one third register, wherein the third register is configured to receive the valid signal from the master through the first control logic, wherein the third register is configured to be enabled by the first control logic;

receiving asserted the ready signal from the slave by at least one second control logic, wherein the second control logic is connected to the first control logic to enable the first register;

registering the ready signal from the slave to the master by at least one fourth register, wherein the first control logic is configured to select, by controlling at least one second multiplexer, whether the ready signal to the master has a value based on the ready signal from the slave or an output of the fourth register;

send data from the master to the slave;

wherein the first control logic configured to select, by controlling at least one first multiplexer whether at least one second register receives data directly from the master, or data from the first register;

wherein the second control logic is configured to select, by controlling at least one third multiplexer, whether data to be sent to the slave is from the second register or the first register;

wherein the configurable logic system is configured to operate on one clock signal line and one reset signal line.

* * * * *